US010374749B1

(12) United States Patent
Kulkarni (10) Patent No.: US 10,374,749 B1
(45) Date of Patent: Aug. 6, 2019

(54) PROACTIVE INTERFERENCE AVOIDANCE FOR ACCESS POINTS

(71) Applicant: Cisco Technology, Inc., San Jose, CA (US)

(72) Inventor: Santosh Babaji Kulkarni, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/108,475

(22) Filed: Aug. 22, 2018

(51) Int. Cl.
| | | |
|---|---|---|
| *H04L 1/00* | (2006.01) |
| *H04B 17/345* | (2015.01) |
| *H04W 72/08* | (2009.01) |
| *H04W 88/10* | (2009.01) |
| *H04B 17/373* | (2015.01) |
| *H04W 16/14* | (2009.01) |

(52) U.S. Cl.
CPC ......... *H04L 1/0017* (2013.01); *H04B 17/345* (2015.01); *H04B 17/373* (2015.01); *H04L 1/0002* (2013.01); *H04L 1/0068* (2013.01); *H04W 72/082* (2013.01); *H04W 88/10* (2013.01); *H04W 16/14* (2013.01)

(58) Field of Classification Search
CPC ... H04L 1/0017; H04L 1/0068; H04L 1/0002; H04B 17/373; H04B 17/345; H04W 88/10; H04W 72/082; H04W 16/14
See application file for complete search history.

(56) References Cited

U.S. PATENT DOCUMENTS

| | | | |
|---|---|---|---|
| 4,236,068 A | 11/1980 | Walton |
| 5,642,303 A | 6/1997 | Small et al. |
| 5,751,223 A | 5/1998 | Turner |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS

Bogale et al., "Machine Intelligence Techniques for Next-Generation Context-Aware Wireless Networks," arxiv.org, Jan. 12, 2018, pp. 1-10 (Year: 2018).*

(Continued)

*Primary Examiner* — Shailendra Kumar
(74) *Attorney, Agent, or Firm* — Polsinelli PC (57) ABSTRACT

Systems, methods, and computer-readable media are provided for predicting presence of interfering signals on given wireless channel(s) on which an access point is operating and proactively implementing an interference avoidance process. In one aspect of the present disclosure, a method includes determining, by an access point operating according to a first wireless technology and at a first time, that interference from signals of a second technology will occur, at a second time that is later than the first time, on a channel on which the access point is currently operating; selecting, by the access point, an interference avoidance process based on a plurality of factors; and implementing, by the access point, the interference avoidance process such that at the second time the access point is not operating on one or more sub-channels spanning the channel on which the access point is currently operating.

9 Claims, 6 Drawing Sheets

(56) References Cited

U.S. PATENT DOCUMENTS

| | | | |
|---|---|---|---|
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,923,780 B2 | 3/2018 | Rao et al. |
| 9,933,224 B2 | 4/2018 | Dumitriu et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1* | 1/2014 | Gauvreau ............ H04L 5/0053 455/426.1 |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1* | 8/2014 | Mermoud ............ H04L 41/142 709/224 |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |

(56) References Cited

U.S. PATENT DOCUMENTS

| | | | |
|---|---|---|---|
| 2015/0065161 | A1 | 3/2015 | Ganesh et al. |
| 2015/0087330 | A1 | 3/2015 | Prechner et al. |
| 2015/0103818 | A1 | 4/2015 | Kuhn et al. |
| 2015/0163192 | A1 | 6/2015 | Jain et al. |
| 2015/0172391 | A1 | 6/2015 | Kasslin et al. |
| 2015/0223337 | A1 | 8/2015 | Steinmacher-Burow |
| 2015/0256972 | A1 | 9/2015 | Markhovsky et al. |
| 2015/0264519 | A1 | 9/2015 | Mirzaei et al. |
| 2015/0280827 | A1 | 10/2015 | Adiletta et al. |
| 2015/0288410 | A1 | 10/2015 | Adiletta et al. |
| 2015/0326704 | A1 | 11/2015 | Ko et al. |
| 2015/0358777 | A1 | 12/2015 | Gupta |
| 2015/0362581 | A1 | 12/2015 | Friedman et al. |
| 2016/0007315 | A1 | 1/2016 | Lundgreen et al. |
| 2016/0044627 | A1 | 2/2016 | Aggarwal et al. |
| 2016/0099847 | A1 | 4/2016 | Melander et al. |
| 2016/0100395 | A1 | 4/2016 | Xu et al. |
| 2016/0105408 | A1 | 4/2016 | Cooper et al. |
| 2016/0127875 | A1 | 5/2016 | Zampini, II |
| 2016/0146495 | A1 | 5/2016 | Malve et al. |
| 2016/0330045 | A1 | 11/2016 | Tang et al. |
| 2016/0344641 | A1 | 11/2016 | Javidi et al. |
| 2017/0026974 | A1 | 1/2017 | Dey et al. |
| 2017/0180999 | A1* | 6/2017 | Alderfer ............... H04W 16/14 |
| 2017/0181136 | A1* | 6/2017 | Bharadwaj ........... H04B 7/0452 |
| 2017/0195205 | A1 | 7/2017 | Li et al. |
| 2017/0202000 | A1 | 7/2017 | Fu et al. |
| 2017/0214551 | A1 | 7/2017 | Chan et al. |
| 2017/0273083 | A1* | 9/2017 | Chen .................... H04L 1/0071 |
| 2017/0317997 | A1 | 11/2017 | Smith et al. |
| 2017/0332421 | A1 | 11/2017 | Sternberg et al. |
| 2017/0339706 | A1 | 11/2017 | Andreoli-Fang et al. |
| 2018/0063018 | A1 | 3/2018 | Bosch et al. |
| 2018/0069311 | A1 | 3/2018 | Pallas et al. |
| 2018/0084389 | A1 | 3/2018 | Snyder et al. |

FOREIGN PATENT DOCUMENTS

| | | |
|---|---|---|
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Bekan et al., "D5.1: Machine Learning Algorityms Development and Implementation," 2016-2018 eWINE Consortium, Dec. 23, 2016, pp. 1-72.

Bogale et al., "Machine Intelligence Techniques for Next-Generation Context-Aware Wireless Networks," arxiv.org, Jan. 12, 2018, pp. 1-10.

"Cisco ASR 5x00 Mobility Management Entity Administration Guide," Version 15.0, Cisco Systems, Inc., Last updated Jun. 13, 2014, pp. 1-266.

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to The University of Liverpool, Sep. 28, 2005, 116 pages.

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "ROAUM: How to Unblock Roaming IoT Using BLockchain," available at https://uploads-ssl.webflow.com/5987a06baeea430016b7bd9/5a7a6d6cee5bc400010a08f2_Roaum_Roaming_IoT_Whitepaper.pdf, pp. 1-14.

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, Ulf, "Supporting Location-Awareness in Open Distributed Systems," May 1998, 186 pages.

Morozov, Yury, "Blockchain Telecom: Bubbletone Blockchain," Dec. 29, 2017, pp. 1-33.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Saraiva de Sousa, Nathan F., et al., "Network Service Orchestration: A Survey," IEEE Communications Surveys & Tutorials, Mar. 23, 2018, pp. 1-30.

(56) References Cited

OTHER PUBLICATIONS

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

Sun, et al., "The future of Wi-Fi," IEEE Communications Magazine, vol. 52, No. 11, Nov. 21, 2014, 166 pages.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

Wright, Joshua, "Detecting Wireless LAN MAC Address Spoofing," Jan. 21, 2003, pp. 1-20.

Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

\* cited by examiner

FIG. 6

PROACTIVE INTERFERENCE AVOIDANCE FOR ACCESS POINTS

TECHNICAL FIELD

The present technology pertains in general to predicting presence of interfering signals on given wireless channel(s) on which an access point is operating and proactively implementing an interference avoidance process to avoid operation of the access point on the given wireless channel(s) when the interfering signals are present.

BACKGROUND

Long Term Evolution (LTE) is expanding its utilization in Unlicensed National Information Infrastructure (U-NII) bands by deploying technologies like LTE Unlicensed (LTE-U) and Licensed Assisted Access LTE (LTE-LAA). However, deploying LTE in unlicensed bands can cause WiFi systems, which are the incumbent systems in U-NII bands, to experience interference. Not only do these radio technologies (LTE and WiFi) not understand each other but in absence of a carrier sense (preamble detect), LTE's coexistence mechanism relies only on Energy Detect (ED) to share a channel. The problem is even more acute in regions where Listen before Talk (LBT) is not mandatory for LTE systems, leading LTE systems to gain access to shared channels more often than WiFi systems since WiFi systems are "polite" and implement random back off.

In order to avoid performance degradation, Wi-Fi Access Points (APs) should ideally try to avoid channels where LTE-U and/or LTE-LAA interference is detected. However, if the AP is configured to operate in wider bandwidths such as 80 MHz or 160 MHz bandwidths, the number of alternative channels available to the AP to select from is limited. While lowering the bandwidth of the AP is an option, it potentially wastes large chunks of the spectrum. Additionally, LTE devices and systems are known to use unlicensed spectrum in an "on-demand" basis. Therefore, completely avoiding channels with LTE-U and/or LTE-LAA interference reduces WiFi channel availability to the WiFi APs, increases spectrum overlap, decreases air time efficiency and reduces overall network capacity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A client can include a device and/or application seeking to execute a function on an Execution Endpoint. Non-limiting examples of a client can include a mobile phone, a laptop, a tablet, etc.

Overview

Disclosed are systems, methods, and computer-readable media for predicting presence of interfering signals on given wireless channel(s) on which an access point is operating and proactively implementing an interference avoidance process to avoid operation of the access point on the given wireless channel(s) when the interfering signals are present.

In one aspect of the present disclosure, a method includes determining, by an access point operating according to a first wireless technology and at a first time, that interference from signals of a second technology will occur, at a second time that is later than the first time, on a channel on which the access point is currently operating; selecting, by the access point, an interference avoidance process based on a plurality of factors; and implementing, by the access point, the interference avoidance process such that at the second time the access point is not operating on one or more sub-channels spanning the channel on which the access point is currently operating.

In one aspect of the present disclosure, an access point is configured to operate on a channel according to a first wireless technology. The access point includes memory having computer-readable instructions stored therein and one or more processors. The one or more processors are configured to execute the computer-readable instructions to determine upcoming interference associated with a second wireless technology on a channel on which the access point is currently operating; and based on a type of the access point and availability of other channels for the access point to switch to, select a process to proactively avoid interference between signals of the access point and signals of the second wireless technology.

In one aspect of the present disclosure, one or more non-transitory computer-readable medium have computer-readable instructions, which when executed by one or more processors of an access point, configure the access point to select a current channel for the access point to communicate with at least one mobile device connected thereto using a first wireless technology; determine upcoming interference from signals of a second wireless technology on the current channel; and perform one of preamble puncturing or channel switching to proactively avoid the upcoming interference before the upcoming interference occurs.

DETAILED DESCRIPTION

As indicated above, LTE devices and systems are known to use unlicensed spectrum in an "on-demand" basis and generally do not implement any type of Listen before Talk process, which means in a battle over using a channel or part of a spectrum, LTE devices and systems usually prevail over WiFi devices and systems.

Furthermore, current solutions implemented by WiFi systems such as completely avoiding channels with LTE-U and/or LTE-LAA interference are inefficient as they result in reduced WiFi channel availability to the WiFi access points (APs), increased spectrum overlap, decreases air time efficiency and reduces overall network capacity.

Hereinafter, example embodiments will be described according to which, based on a predictive machine-learning based process, presence of LTE interference is predicted in advance and appropriate interference avoidance process(es) are implemented by an AP in response thereto.

Figure 1:
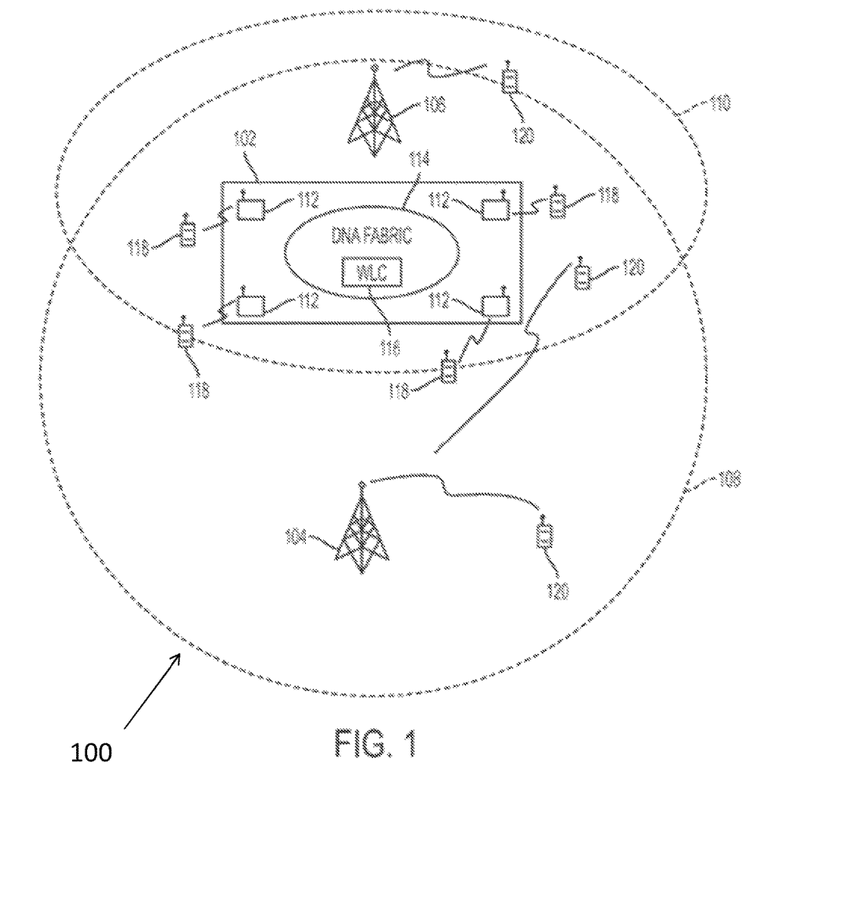
FIG. 1 illustrates an example network setting, according to an aspect of the present disclosure.

The disclosure begins with a description of example network architecture. FIG. 1 illustrates an example network setting, according to an aspect of the present disclosure.

As shown in FIG. 1, setting 100 includes an enterprise network 102. Enterprise network 102 may be in a given geographical location and may be part of a larger enterprise network. For example, enterprise network 102 may cover a particular location of a large institution (e.g., an office building of the institution in one city or state). Accordingly, enterprise network 102 may communicate over a cloud with other components of the larger/umbrella enterprise network. Furthermore, the geographical area in which the enterprise network 102 is located may fall within a coverage area of one or more cellular service providers that provide $4^{th}$ Generation (4G)/LTE and/or $5^{th}$ Generation (5G) cellular services to their respective customers. For example, evolved nodeB (e-NodeB) 104 and e-NodeB 106 may belong to different cellular service providers and have coverage areas 108 and 110 respectively. Enterprise network 102 falls within coverage areas 108 and 110, in the example of FIG. 1.

Enterprise network 102 may provide wireless connectivity to devices connected thereto via one or more access points (APs) 112. APs 112 can be any known or to be developed access point that can provide wireless connectivity such as WiFi connectivity to devices connected thereto. Enterprise network 102 can include a digital network architecture (DNA) fabric 114. In some examples, enterprise network 102 may not include DNA fabric 114 and/or may include one or more network fabrics or infrastructures having a different architecture, configuration, functionality, design, resources, etc. DNA fabric 114 is a non-limiting example element of enterprise network 102 provided herein for illustration and explanation purposes.

DNA fabric 114 can have any number of known or to be developed physical and/or logical components for operations thereof such as one or more edge nodes, a mapping server (MAP server), a Dynamic Host Configuration Protocol (DHCP) server, an Identity Service Engine (ISE), etc. DNA fabric 114 may be physically located at a physical location of enterprise network 102 or may be hosted in a public, private and/or a hybrid cloud. Enterprise network 102 can further include a Wireless Local Area Network (LAN) Controller (WLC) 116. In one example, WLC controller 116 is physically located in a same geographical location as enterprise network 102. Among other known or to be developed functionalities, WLC 116 can be communicatively (or physically) coupled to one or more LTE detectors, which monitor presence of LTE signals of neighboring LTE cells and collect various statistics thereof, as will be described below. Alternatively, WLC 116 can be configured to directly monitor and collect data and statistics on LTE signals of neighboring LTE cells.

Setting 100 can further include one or more mobile devices (client devices) 118 that can connect to enterprise network 102 via one of the APs 112. Examples of mobile devices 118 can include, but are not limited to, a cellular phone, a tablet, a laptop, etc. Mobile devices 118 can be enterprise issued devices and or devices authorized to access enterprise network 102. One or more of mobile devices 118 can also have cellular wireless services provided by one of the service providers associated with eNodeB 104 and/or eNodeB 106.

Setting 100 can also include additional mobile devices 120 that can communicate with one or more of eNodeBs 104 and 106 but are not connected to enterprise network 102. Examples of mobile devices 118 can include, but are not limited to, a cellular phone, a tablet, a laptop, etc.

While FIG. 1 illustrates certain components and a particular number of each component, the present disclosure is not limited thereto. Setting 100 can include any other known or to be developed component and more or less of the components described above (e.g., more or less number of APs 112, etc.).

Any one of APs 112 can operate on a given WiFi channel, defined by industry standards and the governing body (IEEE) that defines such standards. APs 112 can operate in unlicensed spectrum such as U-NII bands, as described above. With the ever increasing presence of LTE systems in the same U-NII spectrum, the possibility of interference on WiFi signals due to presence of LTE signals and hence degradation of WiFi services is increasing. Given the nature of how WiFi APs operate (in a sense that they are "polite" and back off as soon as they detect other interference signals as noise) and the fact that LTE systems operate in an "on-demand" basis, as described above, more efficient mechanism are needed to ensure interference avoidance by WiFi APs while maintaining optimal service quality to mobile devices connected to such APs. Below, several examples of such interference avoidance processes will be described.

While throughout the present disclosure WiFi (first wireless technology) and LTE (second wireless technology) are used as examples of different wireless technologies, between which interference is to be avoided, the disclosed technologies are not limited thereto. For example, the same concepts can be applied to avoid degradation of WiFi services due to presence of radar signals or any other type of signals within the same spectrum.

Figure 2:
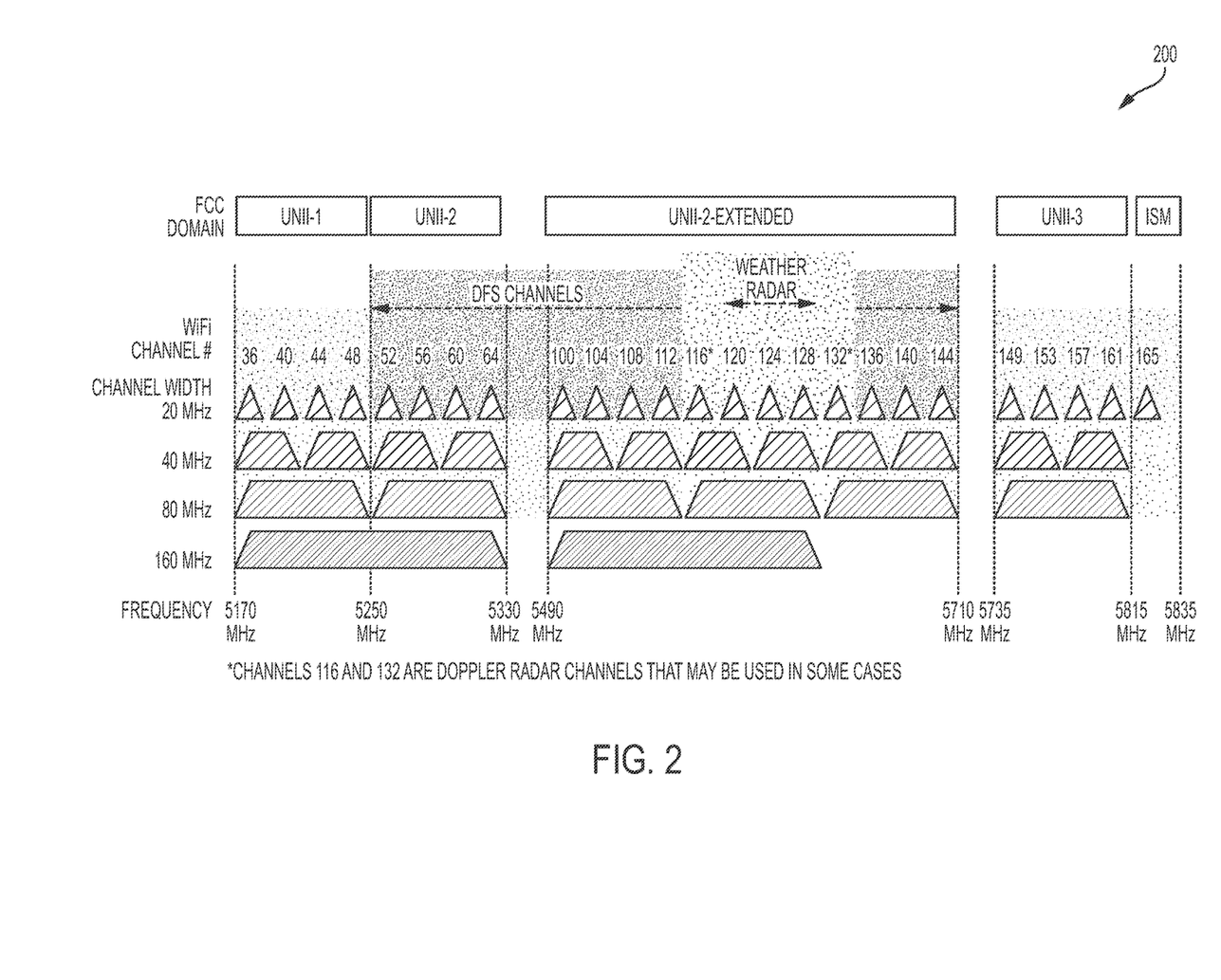
FIG. 2 illustrates an example U-NII channels setup, according to an aspect of the present disclosure.

FIG. 2 illustrates an example U-NII channels setup, according to an aspect of the present disclosure.

Setup 200 of FIG. 2 is based on specifications and standards set for WiFi communication by the Institute of Electrical and Electronics Engineers (IEEE), which is the governing body that establishes WiFi communication standards.

As can be seen from FIG. 2, the Federal Communications Commission (FCC) has split U-NII into several different bands, namely U-NII 1, U-NII 2, UNII-2-Extended, U-NIT 3 and Industrial, Scientific and Medical (ISM) bands. All these bands together span 25 WiFi channels (channels 36, 40, 44, 48, 52, 56, 60, 64, 100, 104, 108, 112, 116, 120, 124, 128, 132, 136, 140, 144, 149, 153, 157, 161 and 165. Together they operate within the 5 GHz band. Furthermore, as shown in FIG. 2, channels 116 and 132 are Doppler radar channels (e.g., used as weather radars). Channels 52-144 may be referred to as Dynamic Frequency Selection (DFS) channels on which any WiFi AP has to listen for presence of radar signals (e.g., for 1 minute in U.S., 10 minutes in Europe, etc.) before switching to any of these DFS channels.

Also FIG. 2 illustrates the various channel bandwidths available for APs 112 to be used. These channels can have 20 MHz bandwidth, 40 MHz bandwidth, 80 MHz bandwidth and 160 MHz bandwidth. The higher the bandwidth used, the faster would be the rate of data transmission between a corresponding AP 112 and mobile devices 118 connected thereto (which is desirable in the context of an enterprise network such as enterprise network 102). As can be seen, the number of alternative channels that can be used by APs 112 decreases as the bandwidth increases. Therefore, an AP 112 operating in the 80 MHz and 160 MHz bandwidth can easily run out of options for channels to use/switch to in presence of LTE interfering signals.

For example, if an AP 112 is currently operating on a 160 MHz bandwidth (spanning sub-channels 36-64), the presence of LTE interfering signals would force it to either not operate (not provide WiFi connectivity for a period of time) or switch to the only other available 160 MHz bandwidth channel (spanning sub-channels 100-144). Furthermore, if such LTE interfering signal is on one or more sub-channels of 36-44 (e.g. channel 52), simply switching to the other 160 MHz bandwidth channel, would waste other sub-channels of 36-44 (36-48 and 56-64) that remain unused. In other words, 87.5% of the sub-channels 36-44 remain unused and are wasted.

Another option for such AP 112 is to switch to lower bandwidth channels, which may not be desirable as lower bandwidths may not be sufficient to support optimal data transmission rates for the underlying services (e.g., streaming or cloud based collaboration on industrial scale projects) used by connected mobile devices 118.

IEEE has recently introduced the next generation of wireless communication standards for use in access points referred to as IEEE 802.11ax aimed at high-density WiFi deployments such as within enterprise network 102. IEEE 802.11ax has a feature that is referred to as "preamble puncturing." In preamble puncturing modes, the preamble part (of a signal exchanged with a connected mobile device) will be punctured by the AP, which identifies particular sub-channels that are to be avoided for data transmission.

For example, assuming an AP 112 is operating on a 160 MHz bandwidth channel spanning sub-channels 36-64 and that LTE interference is detected on sub-channels 40 and 64, AP 112 (which is an IEEE 802.11ax AP) performs preamble puncturing to exclude any data transmission on 20 MHz bandwidth sub-channels 40 and 64. In other words, instead of going silent or switching to another channel, such AP 112 continues to operate in the 160 MHz channel spanning sub-channels 36-64 but instead of utilizing all sub-channels, it will utilize sub-channels 44, 48, 52, 56 and 60. This avoids wasting sub-channels 44, 48, 52, 56 and 60.

The above preamble puncturing is used in a reactive manner, meaning that after an AP determines/detects occurrence of an LTE interfering signal on a current channel or one or more sub-channels thereof, the AP can perform preamble puncturing, switch to other channels, etc. Furthermore, should preamble puncturing not be available to an AP, the alternative options would be to switch to other channels, go silent until interference is no longer detected, etc. As noted above, one requirement for using DFS sub-channels is for an AP to perform a Listen before Talk (LBT) process. The LBT process can take anywhere from a minute to 10 minutes or more. Therefore, an AP that is currently servicing one or more connected devices, would need to be in a listening mode for a couple of minutes before switching to a DFS channel, which means no WiFi access can be provided to devices connected thereto during such time.

The above problems can all be addressed by proactively predicting LTE presence of channels and sub-channels before the interference is detected so that an AP can take appropriate action to avoid interference and hence minimize any interruption in services to connected devices.

This proactive approach is based on a machine-learning process that is continuously trained using observed LTE activity on WiFi channels. An example of such machine-learning process is described below.

Figure 3:
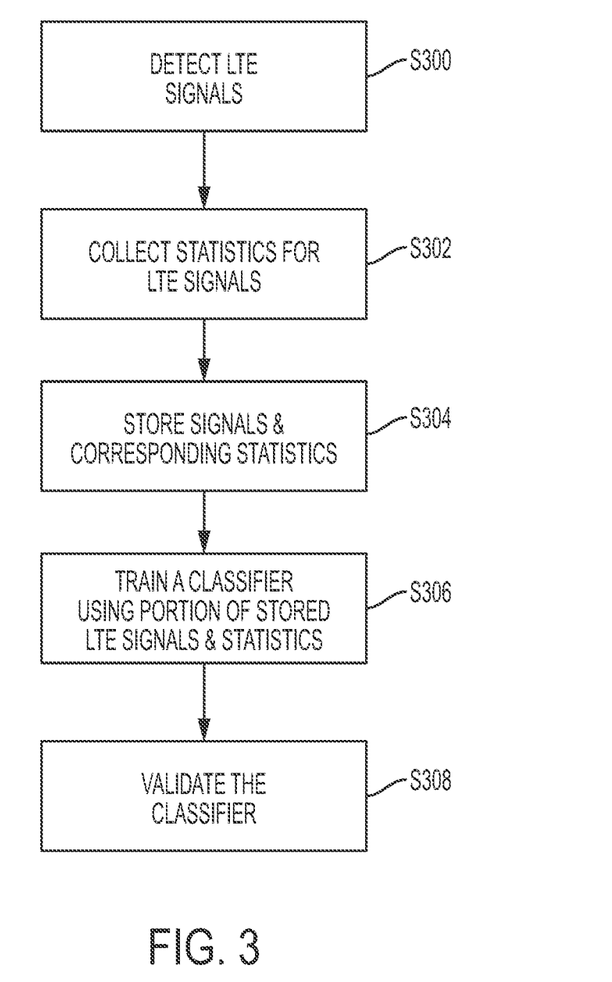
FIG. 3 illustrates an example machine-learning process for predicting LTE activity in U-NII, according to an aspect of the present disclosure.

FIG. 3 illustrates an example machine-learning process for predicting LTE activity in U-NII, according to an aspect of the present disclosure. FIG. 3 will be described from the perspective of WLC 116 of FIG. 1. However, it will be understood WLC 116 can have one or more processors configured to execute computer-readable instructions to perform the steps of FIG. 3. While in this example, WLC 116 is described as performing steps of FIG. 3, the present disclosure is not limited thereto. For example, with sufficient memory and processing capacities, any one or more of APs 112 can also implement the machine-learning process of FIG. 3.

At S300, WLC 116 detects, via one or more LTE detectors, presence of LTE signals within any one or more of WiFi channels shown in FIG. 2. This may be done according to any known or to be developed method. In other words, the one or more LTE detectors forward data collected on LTE signals to WLC 116.

At S302 and upon detecting an LTE signal, WLC 116 collects various statistics (variables) for each detected LTE signal. Such statistics can include, but are not limited to, affected WiFi channel number, affected subcarriers, location at which the LTE signal is detected, affected APs 112, a corresponding service provider, a corresponding duty cycle, energy detected, weather conditions at the location at which the LTE is detected, a detection confidence factor, time of detection including hour of the day, day of the week, day of the month, month of the year, etc.

At S304, WLC 116 records the detected LTE signals and corresponding statistics in a database.

At S306, WLC 116 trains a machine-learning classifier with a portion of the detected LTE signals and the corresponding statistics, using known or to be developed methods. The machine-learning classifier can implement one or more machine learning algorithms, such as regression (e.g., logistic regression, linear regression, etc.), decision tree, clustering (e.g., Naïve Bayes, Gaussian Naïve Bayes, etc.), neural network (e.g., back propagation, forward propagation, convolutional, etc.), and the like. Moreover, the machine-learning classifier can be trained via one or more training techniques such as supervised learning, unsupervised learning, semi-supervised learning, etc.

At S308, WLC 116 performs validation process on the training. The validation process can include performing goodness-to-fit tests to fine tune the classifier, validating the classifier accuracy on portions of the detected LTE signals and the corresponding statistics not used in the training at S306, calculating output error via a loss function, etc. The classifier can be fine-tuned by, for example, adjusting weights, biases, and/or other parameters used by the classifier.

The process of FIG. 3 results in a classifier that can be used by any one or more of APs 112 to predict the presence of LTE interference on channel(s) on which they operate and proactively take steps to avoid LTE interference. This will be further described below with reference to FIG. 4.

The process of FIG. 3 can be performed by WLC 116 continuously (e.g., 24 hours a day, a set period of time over every 24 hour period, etc.).

Figure 4:
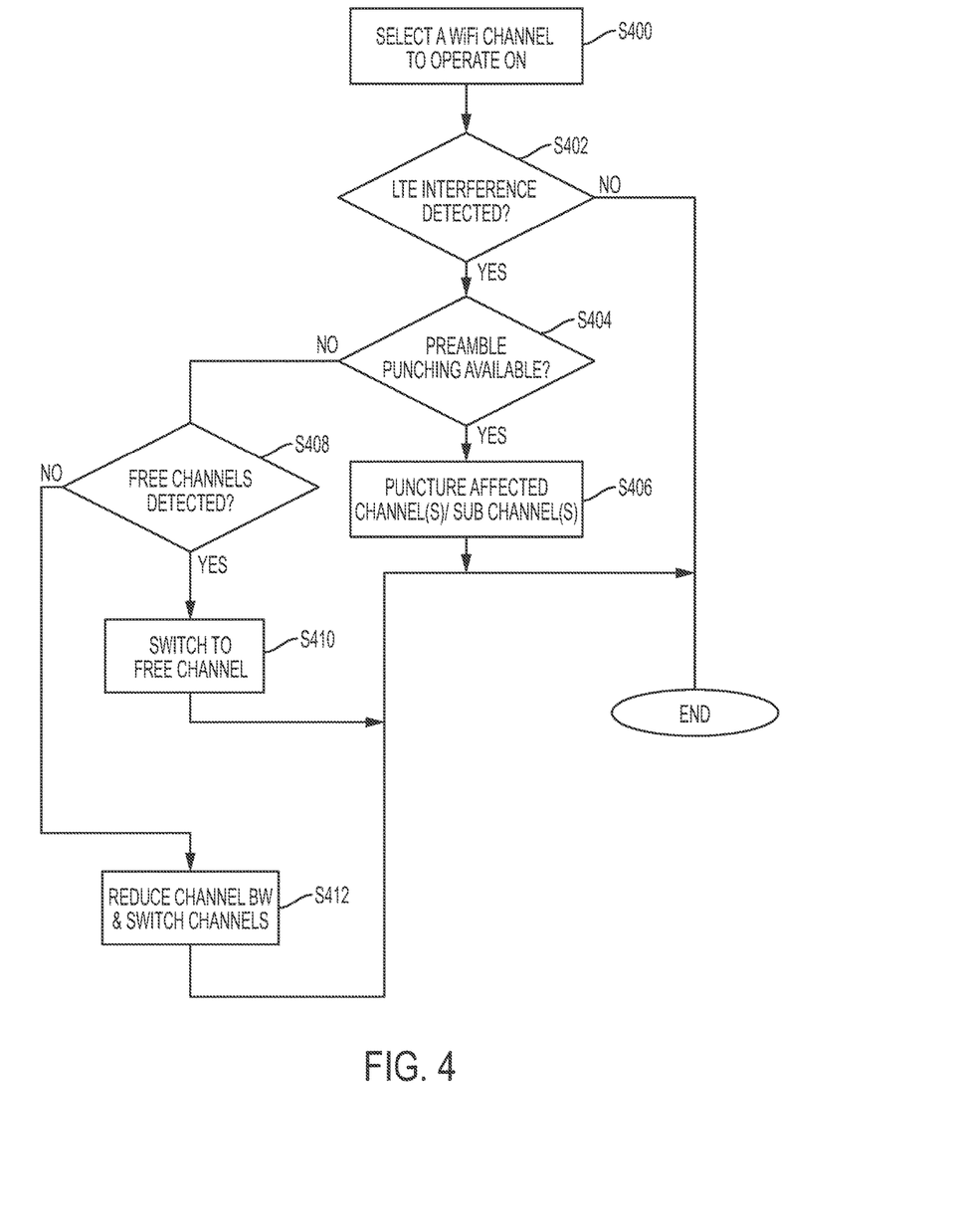
FIG. 4 illustrates an example method of proactive LTE interference avoidance, according to an aspect of the present disclosure.

FIG. 4 illustrates an example method of proactive LTE interference avoidance, according to an aspect of the present disclosure. FIG. 4 will be described from the perspective of an AP 112, which can be any one of APs 112 shown in FIG. 1. However, it will be understood AP 112 can have one or more processors configured to execute computer-readable instructions to perform the steps of FIG. 4.

Initially and at S400, AP 112 selects a WiFi channel having a certain channel bandwidth (e.g., 20 MHz, 40 MHz, 80 MHz, or 160 MHz) to operate on based on the type of service requested, the quality of service (QoS) requested, etc.

At S402, AP 112 queries WLC 116 (at a first point in time) to determine whether there is going to be an upcoming LTE interference on channel(s)/sub-channel(s) on which AP 112 is currently operating at a second time which is later than the first time. The query may be done periodically (e.g., every minute, every few minutes, once every hour, etc.).

For example, the classifier, based on statistics collected over time, may determine that there is going to be LTE interference on sub-channels 52 and 64 on Thursdays between the hours of 11 AM and 12 PM. Therefore, the classifier can relay the LTE interference information to AP 112 in response to the query.

If the query reveals no upcoming LTE interference, the process ends or alternatively returns back to S400 and S400 and S402 are repeated until an upcoming LTE interference is determined.

Upon detection of an upcoming LTE interference, AP 112 can assess a plurality of factors (e.g., availability of preamble puncturing, availability of free channels or possibility of reducing channel bandwidth) to determine (select) a course of action (an LTE avoidance process and implement the same.

Once an upcoming LTE interference is detected at S402, at S404, AP 112 determines if preamble puncturing is available. This determination is based on a type of AP 112 (e.g., whether AP 112 is IEEE 801.11ax compliant or not) and whether devices connected to AP 112 are IEEE 801.11ax compliant or not. If not, the process proceeds to S408, which will be described below.

If AP 112 determines that preamble puncturing is available, at S406, AP 112 performs preamble puncturing to avoid transmission of data on punctured sub-channels (e.g., sub-channels 52 and 64 of the example described above due to upcoming LTE interference thereon on Thursdays between 11 AM and 12 PM). This preamble puncturing may be performed within a few seconds, minutes, etc. of approaching 11 AM on Thursdays and for a duration of the interference. Accordingly, AP 112 can remain on the 160 MHz channel spanning sub-channels 36-64 and use sub-channels 36-48, 56 and 60 while avoiding sub-channels 52 and 64.

Thereafter, the process ends or alternatively returns back to S400 and the process starting from S400 is repeated.

If preamble puncturing is not available, then at S408, AP 112 determines if there are free adjacent channels for AP 112 to switch to. For example and referring back to FIG. 2, when AP 112 is operating on a 160 MHz channel spanning sub-channels 36-64 and assuming that LTE interference is upcoming on sub-channels 52 and 64, AP 112 determines if the other 160 MHz channel spanning sub-channels 100-128 is available. As noted above, sub-channels 100-128 are DFS channels, for which AP 112 needs to perform LBT to ensure the channels are radar/LTE free before switching thereto. This LBT process can be performed using secondary/spare 5 GHz interfaces of AP 112. There may be a set time period for which AP 112 needs to perform LBT (e.g., 1 minute, 10 minutes, etc.). Accordingly, 1 minute or 10 minutes prior to 11 AM on Thursdays, AP 112 performs LBT on sub-channels 100-128 to see if they are radar/LTE free.

If AP 112 determines, after performing LBT, that sub-channels 100-128 are LTE/radar free (free from LTE and/or radar signals interference), then at S410, AP 112 switches to the 160 MHz channel spanning sub-channels 100-128. Thereafter, the process ends or alternatively returns back to S400 and the process starting from S400 is repeated.

If AP 112 determines, after performing LBT, that sub-channels 100-128 are not LTE/radar free, then at S412, AP 112 performs channel bandwidth reduction to switch to channels having lower bandwidths. For example, AP 112 determines if it can switch to any one of 80 MHz channels spanning sub-channels 36-48, 52-64, 100-112, 116-128, 134-144 or 149-161.

In the example where LTE interference is upcoming on sub-channels 52 and 64 and assuming that no preamble puncturing or other adjacent channels of same bandwidth are available, AP 112 determines that it can switch to any one of 80 MHz channels mentioned above except the one spanning sub-channels 52-64 (due to the upcoming LTE interference). Furthermore and as appropriate, AP 112 may perform LBT on 80 MHz channels that span DFS sub-channels. AP 112 then switches to a selected 80 MHz bandwidth channel. Thereafter, the process ends or alternatively returns back to S400 and the process starting from S400 is repeated.

In switching to a free adjacent channel of the same bandwidth at S410 and or a channel of lower bandwidth at S412 and assuming that there are multiple options for each to select from, AP 112 may take into consideration and make a selection based on various factors that include, but are not limited to, AP 112's capabilities. AP 112's current operating bandwidth, a percentage of subcarriers affected, other LTE-free channels available, QoS demand from mobile devices 118 connected to and associated with AP 112 and the minimum supporting bandwidth needed, capabilities of mobile devices 118 connected to and associated with AP 112 and a resulting number of channel changes in the neighborhood of AP 112.

Having described various examples of predicting upcoming LTE interference on WiFi channels and proactively avoiding such interference, the disclosure now turns to examples of system architecture and network devices that can be used as components of setting 100 (e.g., WLC 116, APs 112, etc.).

Figure 5:
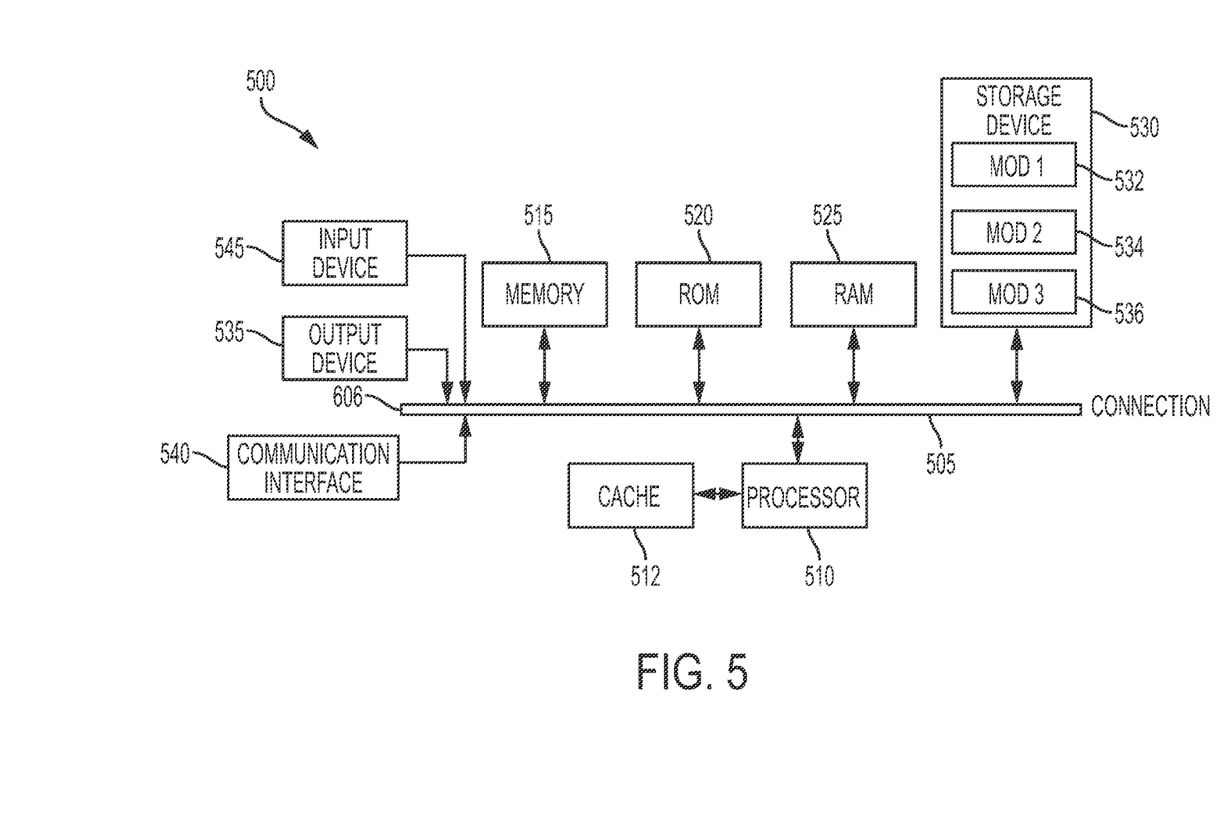
FIG. 5 illustrates an example computing system architecture for use in setting of FIG. 1, according to an aspect of the present disclosure.

FIG. 5 illustrates computing system architecture for use in network of FIG. 1, according to an aspect of the present disclosure. Computing system architecture 500 has components that are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

Figure 6:
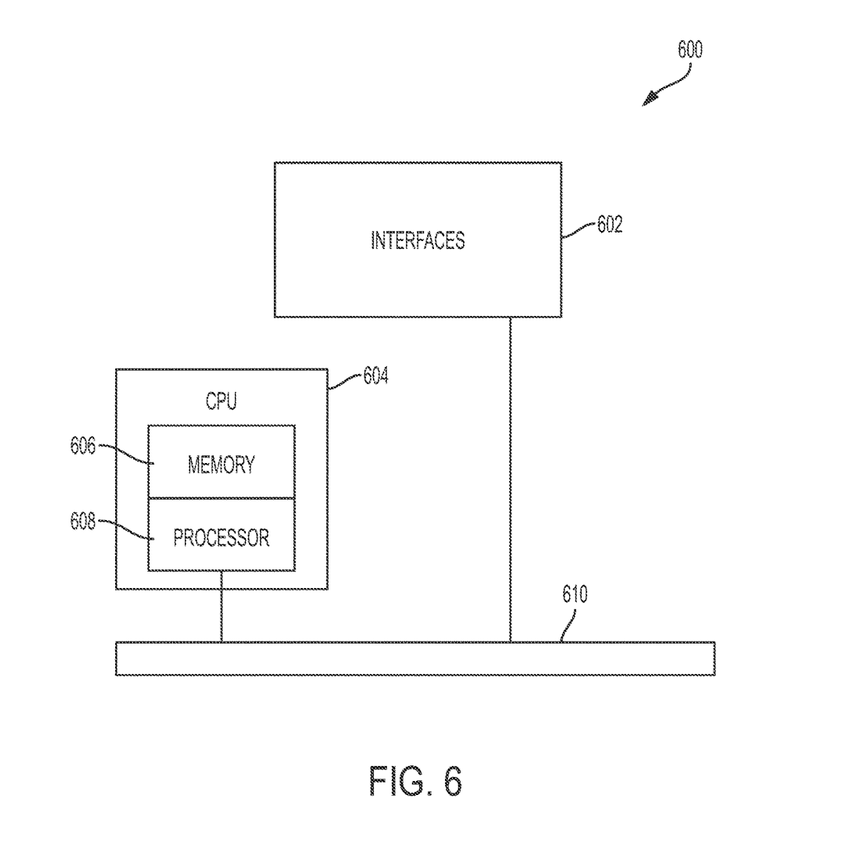
FIG. 6 illustrates an example network device suitable for any of the components of FIG. 1, according to an aspect of the present disclosure.

FIG. 6 illustrates an example network device suitable for any of the components of FIG. 1, according to an aspect of the present disclosure. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   predicting a second time, by an access point operating according to a first wireless technology and at a first time, that interference from signals of a second technology will occur at the second time that is later than the first time, on a channel on which the access point is currently operating;
   selecting, by the access point, an interference avoidance process based on a plurality of factors, comprising:
   first determining it preamble puncturing is available for the access point;
   and selecting, in response to a positive result to the first determining, the preamble puncturing as the interference avoidance process;
   second determining, in response to a negative result to the first determining, if there is one or more adjacent channels for the access point to switch to, the one or more adjacent channels having a same bandwidth as the channel on which the access point is currently operating;
   selecting, in response to a positive result to the second determining, one of the one or more adjacent channels for the access point to switch to if the one or more adjacent channels are available;
   third determining, in response to a negative result to the second determining if there are one or more channels having a lower bandwidth than the channel on which the access point is currently operating;
   selecting, in response to a positive result to the third determining, one of the one or more channels having the lower bandwidth for the access point to switch to; and
   implementing, by the access point, the interference avoidance process such that at the second time the access point is not operating on one or more sub-channels spanning the channel on which the access point is currently operating.

2. The method of claim 1, wherein determining the interference is based on a predictive modeling using past presence of the signals of the second technology on the one or more sub-channels.

3. The method of claim 1, wherein availability of the preamble puncturing is based on a type of the access point.

4. An access point configured to operate on a channel according to a first wireless technology, the access point comprising:
- a memory having computer-readable instructions stored therein; and
- one or more processors programed to execute the computer-readable instructions to perform operations comprising:
  - predicting a second time, by an access point operating according to a first wireless technology and at a first time, that interference from signals of a second technology will occur, at a the second time that is later than the first time, on a channel on which the access point is currently operating;
  - selecting, by the access point, an interference avoidance process based on a plurality of factors, comprising:
    - first determining if preamble puncturing is available for the access point; and
    - selecting, in response to a positive result to the first determining, the preamble puncturing as the interference avoidance process;
    - second determining, in response to a negative result to the first determining, if there is one or more adjacent channels for the access point to switch to, the one or more adjacent channels having a same bandwidth as the channel on which the access point is currently operating;
    - selecting, in response to a positive result to the second determining, one of the one or more adjacent channels for the access point to switch to if the one or more adjacent channels are available;
    - third determining, in response to a negative result to the second determining if there are one or more channels having a lower bandwidth than the channel on which the access point is currently operating;
    - selecting, in response to a positive result to the third determining, one of the one or more channels having the lower bandwidth for the access point to switch to; and
  - implementing, by the access point, the interference avoidance process such that at the second time the access point is not operating on one or more sub-channels spanning the channel on which the access point is currently operating.

5. The access point of claim 4, wherein determining the interference is based on a predictive modeling using past presence of the signals of the second technology on the one or more sub-channels.

6. The access point of claim 4, wherein availability of the preamble puncturing is based on a type of the access point.

7. A non-transitory computer readable media storing instructions that when executed by a processor cause the processor to perform operations comprising:
- predicting a second time, by an access point operating according to a first wireless technology and at a first time, that interference from signals of a second technology will occur at the second time that is later than the first time, on a channel on which the access point is currently operating;
- selecting, by the access point, an interference avoidance process based on a plurality of factors, comprising:
  - first determining if preamble puncturing is available for the access point; and
  - selecting, in response to a positive result to the first determining, the preamble puncturing as the interference avoidance process;
  - second determining, in response to a negative result to the first determining, if there is one or more adjacent channels for the access point to switch to, the one or more adjacent channels having a same bandwidth as the channel on which the access point is currently operating;
  - selecting, in response to a positive result to the second determining, one of the one or more adjacent channels for the access point to switch to if the one or more adjacent channels are available;
  - third determining, in response to a negative, result to the second determining if there are one or more channels having a lower bandwidth than the channel on which the access point is currently operating;
  - selecting, in response to a positive result to the third determining, one of the one or more channels having the lower bandwidth for the access point to switch to; and
- implementing, by the access point, the interference avoidance process such that at the second time the access point is not operating on one or more sub-channels spanning the channel on which the access point is currently operating.

8. The media of claim 7, wherein determining the interference is based on a predictive modeling using past presence of the signals of the second technology on the one or more sub-channels.

9. The media of claim 7, wherein availability of the preamble puncturing is based on a type of the access point.

* * * * *